United States Patent [19]

Westelaken

[11] 4,125,945

[45] Nov. 21, 1978

[54] MULTIPLE STAGE GRAIN DRYER WITH INTERMEDIATE STEEPING

[75] Inventor: Christianus M. T. Westelaken, St. Marys, Canada

[73] Assignee: Westlake Agricultural Engineering, Inc., St. Marys, Canada

[21] Appl. No.: 798,129

[22] Filed: May 18, 1977

[51] Int. Cl.² ............... F26B 19/00; F26B 17/12
[52] U.S. Cl. ......................... 34/65; 34/66; 34/167; 34/169; 34/171
[58] Field of Search ......... 34/13, 65, 66, 56, 164–169, 34/171, 174, 178, 147, 185, 186, 236, DIG. 2; 432/95, 96, 99, 100, 102, 77–79

[56] References Cited

U.S. PATENT DOCUMENTS

| | | | |
|---|---|---|---|
| 2,108,118 | 2/1938 | Greenawalt | 432/96 |
| 2,386,670 | 10/1945 | Evans | 34/167 |
| 2,458,434 | 1/1949 | Simpson | 34/168 |
| 2,676,095 | 4/1954 | Vaney et al. | 34/168 |
| 2,706,343 | 4/1955 | Oholm | 34/13 |
| 2,858,123 | 10/1958 | Niems | 34/167 |
| 3,060,589 | 10/1962 | Wallin | 34/13 |
| 3,325,912 | 6/1967 | Bojner et al. | 34/169 |
| 3,604,126 | 9/1971 | Whelan | 34/169 |
| 3,955,916 | 5/1976 | Buchner | 432/96 |
| 3,998,929 | 12/1976 | Leyshon | 432/77 |

Primary Examiner—Henry C. Yuen

[57] ABSTRACT

A concurrent-countercurrent flow type grain dryer is described having an improved wet grain-drying air contacting arrangement. The dryer is in the form of a tower, with the grain passing from top to bottom by gravity flow. The tower has a wet grain bin at the top with intermediate drying zones and metering grain outlets at the bottom for controlling the rate of movement of grain through the tower. The drying zone is divided into several sections including at least two concurrent flow hot air drying zones with a steeping zone between each pair of concurrent flow hot air drying zones, followed by a countercurrent flow cooling zone. The use of two or more concurrent flow drying zones with intermediate steeping zones have been found to remarkably improve both the rate of flow of grain through the dryer and the moisture removal efficiency. Still greater efficiencies have been achieved by recycling the outlet drying air from one drying zone to the inlet drying air of a subsequent drying zone.

13 Claims, 6 Drawing Figures

MULTIPLE STAGE GRAIN DRYER WITH INTERMEDIATE STEEPING

BACKGROUND OF THE INVENTION

1. Field of the Invention

This invention relates to an improvement in grain dryers of the concurrent-countercurrent flow type.

2. Summary of the Prior Art

It is frequently necessary to dry grain before it is stored. Otherwise, the moisture content of the grain may cause discolouration and spoilage during storage.

This need to dry grain prior to storage has long been recognized and many systems have been developed over the years for this purpose. In many of these prior systems, grain is heated quickly to a maximum temperature and then quickly cooled by exposure to air. One of the most difficult problems associated with this type of system has been that the quick temperature changes have tended to result in stress cracking and shattering of the grain. This, of course, greatly lowers the value of the grain such that it may not even be considered acceptable to many grain elevators and processors.

Many systems have been developed over the years which are intended to heat and dry the grain uniformly while at the same time avoiding the problems of stress cracking. One such system is the cross-flow column type grain dryer in which air is transversely forced through the downwardly moving grain in an attempt to evaporate moisture. However, with this type of dryer, great difficulty is encountered in trying to provide a uniform air flow and heating path and generally the grain has been dried very unevenly by this type of system.

Counter flow drying systems have also been widely used in which drying air is forced through the grain in a direction opposite to the direction of grain travel. Of course, with this system the dried grain at the bottom of the bin is exposed to the hottest air and the wet grain at the top is exposed to cooler air. While this is the most efficient drying method now available, it does have the rather serious problem that some of the grain is over-dried, resulting in cracking of the kernels and lowering of quality.

A more recent development which is proving to be quite successful is the concurrent-countercurrent flow grain dryer in which hot drying air travels downwardly in the same direction as the flowing grain and a countercurrent flow of cooling air travels in a direction opposite to the direction of the grain travel. With this system, air exhaust means are provided intermediate the hot air inlet and cooling air inlet. It will be seen that with this system, the hottest air is used at the point where it is of greatest value, i.e. where the grain is wettest and coolest, and as the two travel together, the air heats and dries the grain while the grain gradually cools the air. The counter flow of cooling air serves to further cool and temper the grain before it reaches the grain outlet at the bottom of the bin.

One of the earliest concurrent-countercurrent grain dryers is described in Oholm U.S. Pat. No. 2,706,343. However, the Oholm system has the disadvantage of presenting a V-shaped grain surface area exposed to the entering hot air. This V-shaped surface area of the grain bed results from the grain falling free from a feed spout into a pile having sloping conical sides. Thus, the length of time that individual particles are exposed directly to the hot air will vary according to the particle position on the pile, with those embedded near the peak of the pile being exposed for a shorter period than those embedded on the side slopes.

In prior practice in order to arrive at some practical acceptable average moisture level for most of the grain flowing through the bed, it has been necessary to over dry at least some of the grain.

An effort to overcome such a problem is described in Anderson, Canadian Pat. No. 940,295 in which a means is provided by which grain to be dried is periodically introduced to the drying bed and evenly spread over the entire area of the hot air inflowing end of the bed, as in successive flat layers, without exposing the wet grain being added to the heated dry air until the wet grain being added has been deposited on the bed.

The Anderson system is a reasonably efficient drying system and can produce a good quality dried grain but suffers from being very expensive to construct and also provides operational difficulties because of the structural complexity of the movable sweeps used for evenly distributing the incoming wet grain across the drying bed.

A substantial improvement over the Anderson system is described in Westelaken, U.S. application Ser. No. 770,048 filed Feb. 18, 1977, now U.S. Pat. No. 4,086,708. It describes an improved wet grain-hot air contacting arrangement and includes a wet grain bin having a horizontal floor assembly with a plurality of uniformly spaced openings, with a tube member extending downwardly beneath each such opening. These tubes serve to deliver wet grain in response to gravity from the bin into a drying chamber. A hot air inlet duct is provided adjacent the tube members to deliver hot air into the space between the tube members and downwardly through a bed of grain in the drying chamber. The bottom of the drying chamber has metering grain outlets as well as cooling air inlet ducts, while air exhaust ducts are provided intermediate the hot and cooling air inlets. The novel floor assembly permits the wet grain to be cyclically delivered into the drying chamber with a pulsating action, which causes a lateral flow resulting in uniform layers of wet grain being deposited in the drying chamber, where it comes into contact with the hot air. That system has shown very substantial improvements both in the efficiency of moisture removal and the quality of the dried grain.

SUMMARY OF THE INVENTION

It has now been found that even greater improvements can be achieved in grain drying in terms of efficiency of moisture removal and flow rates of grain through a dryer by the use of a vertical tower with multiple concurrent flow drying zones and a steeping zone between each pair of drying zones. In the steeping zone the moisture profile in the individual kernels of grain tend to equalize and provide a more uniform total drying of the grain, while also permitting higher drying temperatures.

Thus, the present invention in one aspect relates to a grain dryer comprising a tower with side walls, a top and bottom, the tower having a wet grain receiving bin at the top. This bin has a horizontal floor assembly extending across between the side walls of the tower, the floor assembly having a plurality of substantially uniformly spaced openings extending over substantially the entire floor assembly with a wet grain delivery tube member fixed beneath each such opening. Each tube member serves to deliver wet grain in response to gravity from the receiving bin into a first drying chamber located in the tower beneath the floor assembly. A first heated air inlet is provided adjacent the tube members of the floor assembly adapted to deliver heated air into the space between the tube members, and downwardly through a bed of grain in the first drying chamber. Exhaust ducts extend across the tower at the bottom of the first drying zone to receive and exhaust moisture-laden air flowing from the first heated air inlet in a concurrent direction to grain flow. A steeping chamber is located in the tower beneath the exhaust ducts to allow the moisture profile in the individual kernels of the grain to equalize. The steeping chamber has a floor with a plurality of substantially uniformly spaced openings extending over the substantially the entire floor area with a wet grain delivery tube member fixed beneath each such opening. A second heated air inlet is provided adjacent the tube members of the second floor and adapted to deliver heated air into the spaces between the tube members and downwardly through a bed of grain in a second drying chamber beneath the second floor. Cooling air inlet ducts extend across the bottom of the second drying chamber for directing cooling air upwardly through the bed of grain, with exhaust ducts extending across the second chamber intermediate the hot and cooling air inlet ducts to receive an exhaust air flowing from the second heated air inlet in a concurrent direction to grain flow and to receive an exhaust cooling air flow from the cooling air inlet ducts in a countercurrent direction to grain flow. Means are provided for directing heated air to the heated air inlets and cooling air to the cooling air inlets and the bottom of the tower includes metering means for withdrawing grain from the tower at a controlled flow rate.

According to an alternative embodiment of the invention, additional heated air drying zones can be included with a steeping zone provided between each pair of concurrent flow drying zones.

According to a particularly preferred embodiment, it has been found beneficial to provide recycling of outlet drying air from this first stage into the second stage and recycling of outlet drying air from the second stage into the third stage, etc. depending on the number of stages used.

Yet another feature of the present invention relates to a method of drying grain comprising utilizing the grain dryer as described above.

This multiple stage dryer can be used for all types of grains but is particularly advantageous for the drying of grains which are easily damaged during drying. Thus, it can be used for the drying of the usual grains such as corn, wheat, etc. but also for the drying of rice, soybeans, white beans, rape seed, etc.

This multiple stage dryer permits the use of very high drying temperatures in the first stage of an excess of 500° F. For instance, corn can be dried in a three stage dryer very successfully with a first stage drying temperature of 500° - 525° F, a second stage drying temperature of 400° - 425° F and a third stage drying temperature of 275° - 300° F. For the drying of rice, it is necessary to go to rather lower temperatures, such as 250° F in the first stage, 175° F in the second stage and 125° F in the third stage. With the capability of using very high temperatures in the first drying stage, the drying is much faster without damage to the grain and this means that a dryer has a greater capacity per unit area of tower and also greater fuel economy because of increased moisture removal efficiency. For instance, in drying corn from 27% moisture to 15% moisture, a 15 foot square drying tower was able to dry 1500 bushels per hour while a 12 foot square tower with two drying stages was able to dry 2400 bushels per hour. Moreover, this was achieved with a remarkable increase in moisture removal efficiency in that the single stage dryer required approximately 2200 B.T.U. per pound of water removed while a two stage dryer required only about 1500 B.T.U. per pound of water removed without air recirculation.

The use of steeping in the drying of grain has long been known, but this has usually been done in a separate stage for at least 12 hours and has as much as 48 hours. With the system of this invention, very remarkable improvements in moisture removal efficiency are achieved with steeping times of as little as 1 hour or less, preferably more than 1 hour, this being the time for the grain to move by gravity flow through the steeping zone. In a commercial reactor, this can be achieved in a steeping zone having a height of as little as 6 feet, although a height of about 12 feet or more is more usual. For instance, in the drying of corn using the single stage system of copending application Ser. No. 770,048, now U.S. Pat. No. 4,086,708, the efficiency of moisture removal was 2189.0 B.T.U./lb of water removed. On the other hand, using a two stage dryer of the type shown in FIG. 1 of this application with a steeping time of 1½ hours, a grain flow rate of 10 bu/hr/ft², a first stage inlet air temperature of 400° F and a second stage inlet air temperature of 380° F, the efficiency was increased to 1479.4 B.T.U./lb of water removed. This represents an increase of over 32%.

The steeping zones according to this invention are operated at quite high temperature and this is an important factor in achieving moisture equalization within the kernels. For example, in the drying of corn in a three-stage drier with a first stage air inlet at 500° F, a second stage at 400° F and a third stage at 300° F, the first steeping zone may be at a temperature of about 140° F and the second steeping zone at a temperature of about 150° F. These high temperatures within the tower are also important in making drying air recirculation viable. Thus, even though the exhaust air from the first or second stage may have a high moisture content in terms of absolute humidity, the relative humidity of the recirculated air at the operating temperatures is still sufficiently low for effective moisture removal from the grain.

The height of the drying zones can very considerably but for commercial driers, a first stage drying zone is typically about 3 to 4 feet high, a second stage drying zone about 4 to 5 feet high and a third stage drying zone about 5 to 6 feet high. These represent optimum values for maximum drying efficiency.

BRIEF DESCRIPTION OF THE DRAWINGS

Certain preferred embodiments of the invention are illustrated by the following drawings in which:

Referring to FIGS. 1 and 2, there is shown one embodiment of the dryer according to this invention. This includes a tower 10 constructed in a series of modular sections including frame members 11, sheet metal panels 12, a top 13 and a bottom 14.

Figure 1:
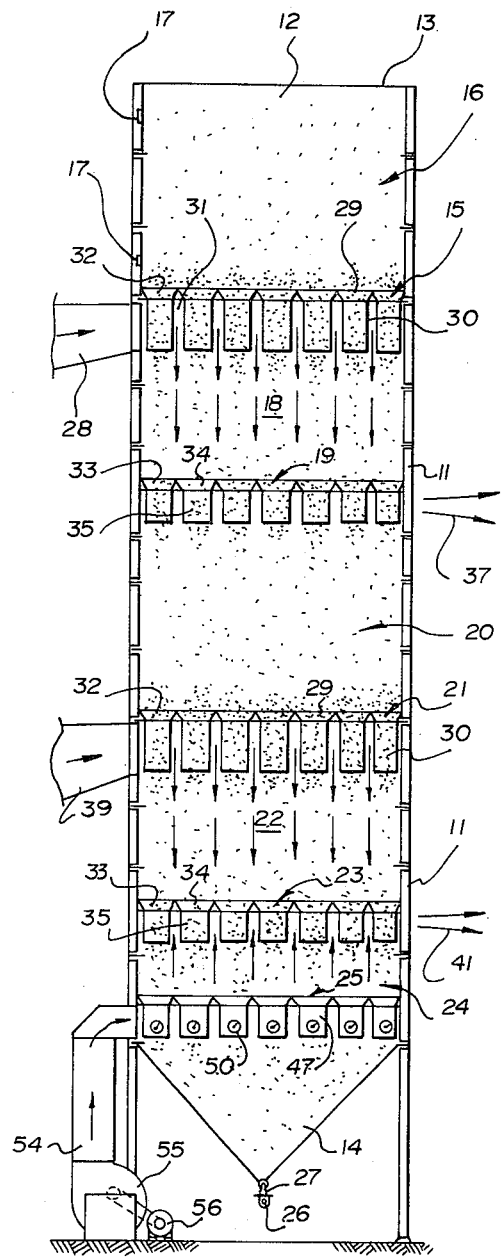
FIG. 1 is a side elevation of a dryer according to the invention showing the internal structure.
Figure 2:
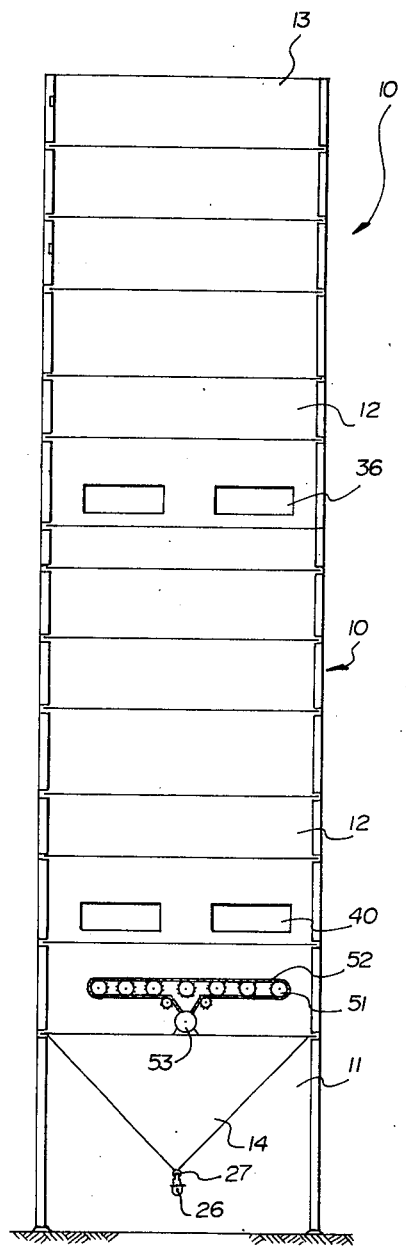
FIG. 2 is an end elevation of the dryer shown in FIG. 1.

Proceeding from the top of the tower, there is provided a wet grain holding bin 16 with high and low level indicators 17 for maintaining a proper level within the bin. A floor assembly 15 forms the bottom of bin 16 and beneath this floor assembly is a first drying chamber 18. The bottom of this drying chamber is formed by a first air exhaust floor 19, beneath which is a steeping zone 20, the bottom of which is formed by a further heated air inlet floor assembly 21. Immediately below the floor assembly 21 is a second drying chamber 22, the bottom of which is formed by a second air exhaust floor assembly 23. This is followed by a cooling zone 24 and a metering roll and cooling air inlet assembly 25.

The bottom portion 14 is in the form of a dry grain receiving hopper at the bottom of which is a grain conveyer 26 for removing grain from the hopper via a rotary air lock 27. If a substantial depth of grain is maintained in the hopper, the air lock 27 can be eliminated.

The floor assemblies 15 and 21 are of the general type described in U.S. Pat. No. 4,086,708, issued May 2, 1978, as are the floor assemblies 19 and 23.

The floor assembly 15 includes a bottom plate member 32 with a series of equally spaced square openings. Extending upwardly and outwardly from the four edges of these holes are inclined panel members 42 with the upper edges of the panel members of adjacent pairs of holes joined to form ridges 43. In this fashion the entire floor area is formed of grain receiving mouths 29.

Connected to the bottom of plate 32 beneath each hole is a wet grain delivery tube 30 with open spaces 31 therebetween. Heated air is blown in by way of inlet duct 28 into the area 31 between the grain delivery tubes 30 and this heated air contacts the surface of the grain in the drying chamber 18. The tube members 30 are of a size and spacing from each other such that the wet grain is delivered through the tube members into the drying chamber with a pulsating action and the wet grain flowing into the drying chamber forms a layer over the entire area between the tube members during each pulsation.

The air exhaust floor 19 again is formed with a floor panel 33 with a series of equally spaced square holes. A grain receiving mouth 34 extends upwardly from each hole and a perforated tube 35 extends downwardly beneath each hole. The air passing through the grain exhausts through these perforations and out through openings 36 in the wall of the section as an exhaust flow 37. The second stage heated air intake floor assembly 21 is identical in construction to assembly 15 with heated air being fed in through inlet duct 39. The second stage air exhaust assembly 23 again is identical to assembly 19 with the air exhaust through holes 40 as an outflow 41.

Figure 3:
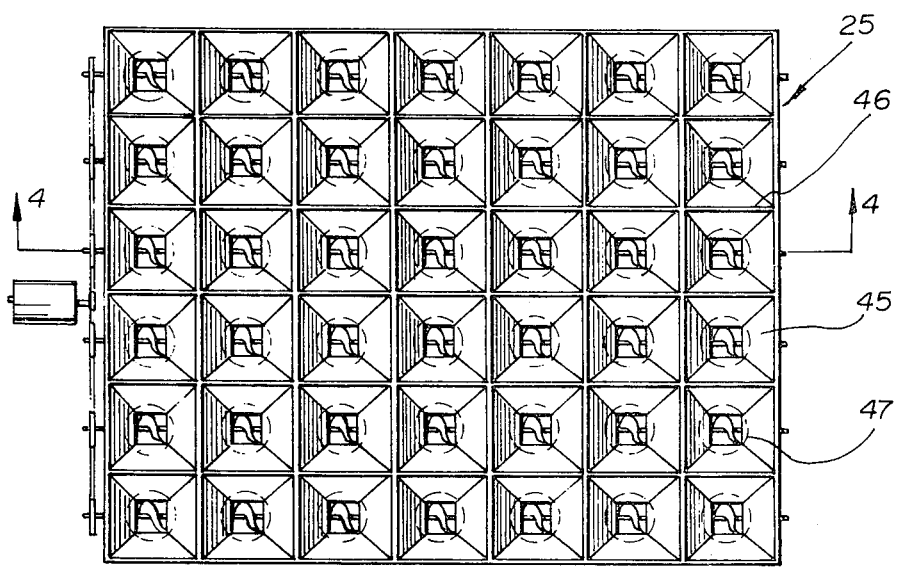
FIG. 3 is a top plan view of a floor assembly.
Figure 4:
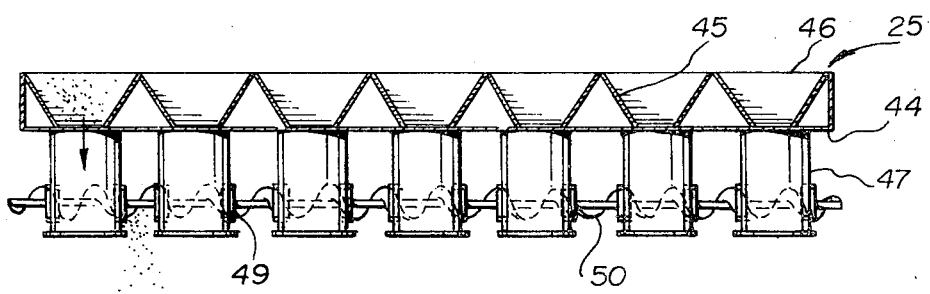
FIG. 4 is a side elevation of a floor assembly with metering rolls.
Figure 5:
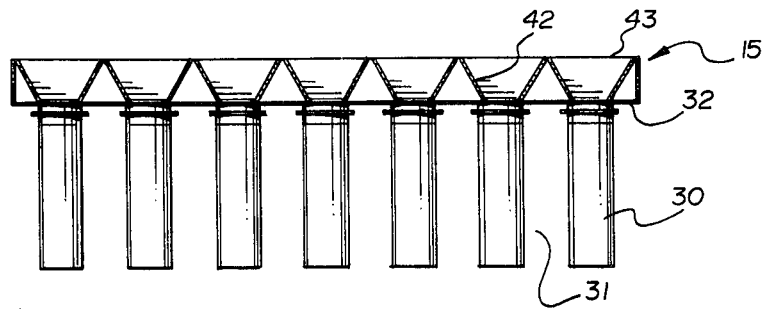
FIG. 5 is a side elevation of a drying zone floor assembly.

The metering floor 25 is shown in detail in FIGS. 4 and 5 and includes a bottom plate 44 with a series of equally spaced square holes. Extending upwardly and outwardly from the four edges of these holes are inclined panel members 45, the upper edges thereof forming ridges 46 to produce a self-cleaning floor. Connected to the bottom of plate 44 beneath each hole is cylindrical delivery tube 47, each tube having a closed bottom end. Each tube includes a pair of laterally opposed holes 49 and an auger 50 extends through these holes in the manner shown in FIGS. 3 and 4. These tubes and augers are arranged in parallel rows as will be evident in FIG. 3 and are connected to operate at uniform speeds by means of toothed wheels 51, a chain drive 52 and a motor 53.

Cooling air is blown in through duct 54 by means of blower 55 and motor 56 and enters the columnar mass of grain through perforations, moving upwardly in a countercurrent flow and out through the ventilating ports 40. The perforations can be in the tubes 47 or in other air delivery systems extending across the bottom of zone 24.

Figure 6:
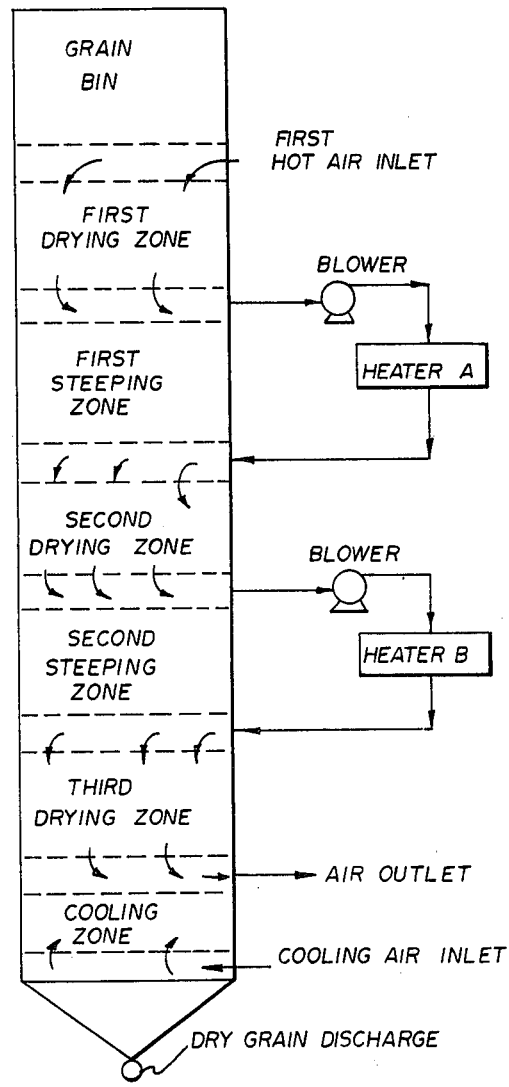
FIG. 6 is a schematic elevational view of a dryer with air recycle.

While the above specific description shows only two heated air drying zones, it will be readily evident that additional modular sections can be added to this tower so that the drying floors 15 and 21 as well as the exhaust floors 19 and 23 can be repeated, forming additional drying zones and steeping zones. FIG. 6 shows such an expanded arrangement with three drying zones and two steeping zones.

The arrangement shown schematically in FIG. 6 also includes heating air recycles with the outlet air from the first drying zone being fed as inlet air into the second drying zone and the outlet air from the second drying zone being fed as inlet air to the third drying zone. Of course, the air temperature in each drying zone drops very substantially and must have heat added thereto during the recycle. Thus, the outlet air from the first drying zone is forced by means of a blower through heater A, while the outlet air from the second drying zone is forced by means of a blower through heater B. This recycle of heating air together with the use of the steeping zones provides even greater economies in terms of heat input for moisture removal.

In order to maintain optimum drying conditions within the different drying zones, the airflow rates for the different zones may be different. Thus, the second drying zone may not be able to use all of the outlet air from the first zone, in which case a portion of the first drying zone outlet air must be vented. This venting is done at a point upstream of the recirculation blower. Of course, if additional air should ever be required, this can be drawn in at a point upstream of a recirculation blower.

Although the schematic drawing shows only single connector points at one side of the grain drying tower, it is to be understood that the air inlets are fed in from two opposite walls of the dryer and that the air outlets are provided on all four walls.

Certain preferred embodiments of the invention will now be illustrated by the following non-limiting examples.

EXAMPLE 1

A series of tests were conducted using grain drying arrangements of the interior configuration shown in FIGS. 1 to 5.

A. For the purpose of comparison, a first test was conducted using a dryer typical of that of copending application Ser. No. 770,048. Thus, it had only one drying zone and one air exit as well as one cooling air inlet. In other words, it was of the configuration of present FIG. 1 with the exhaust floor 19, steeping chamber 20 and drying floor 21 eliminated. The dryer was operated under the following conditions:

| | |
|---|---|
| air temp inlet | 500.0 F |
| humidity air inlet | .0025 |
| airflow | 175.0 cfm/ft$^2$ |
| inlet moisture content | 25.0 %w.b. |
| grain flow | 20.8 bu/hr ft$^2$ |
| grain temp | 60.0 F |

| TEST NUMBER | 1 | 2 | 3 | 4 | 5 | 6 | 7 |
|---|---|---|---|---|---|---|---|
| Ambient Conditions | | | | | | | |
| Dry Bulb Temp., °F | 62 | 52 | 65 | 68 | 68 | 55 | 65 |
| Wet Bulb Temp., °F | 55 | 48 | 57 | 56 | 58 | 53 | 58 |
| Airflow (all stages), cfm | 1600 | 1600 | 1600 | 1600 | 1600 | 1600 | 1600 |
| Drying air temps., | | | | | | | |
| Stage 1, °F | 125 | 165 | 200 | 200 | 225 | 250 | 225 |
| Stage 2, °F | 125 | 165 | 200 | 165 | 200 | 225 | 200 |
| Grainflow, bu/hr | 105 | 84 | 84 | 84 | 105 | 125 | 93 |
| Inlet grain conditions | | | | | | | |
| Temperature, °F | 67 | 66 | 68 | 68 | 69 | 62 | 64 |
| Moisture, % w.b. | 20.6 | 21.1 | 20.1 | 21.0 | 21.0 | 22.3 | 22.6 |
| Cracks, % | 1.3 | 1.3 | 1.0 | 1.0 | 1.7 | 0.6 | 0.7 |
| Splits, % | 0.3 | 0.3 | 0.3 | 0.2 | 0.1 | 0.1 | 0.2 |

| | |
|---|---|
| dryer length | 3.6 ft |
| air temp outlet | 132.4 F |
| humidity air outlet | 0.0356 |
| grain outlet temp | 132.2 F |
| outlet moist content | 25.53 % w.b. |

This provided a moisture removal efficiency of 3360.1 B.T.U./lb of water removed.

B. This test was conducted using a dryer of the configuration of FIG. 1, i.e. with two drying stages and a steeping zone having a height of 12 feet. The first stage was operated under the conditions as given in part A above, while the second stage drying was operated under the following conditions:

| | |
|---|---|
| air temp inlet | 400.0 F |
| humidity air inlet | .0025 |
| airflow | 125.0 cfm/ft$^2$ |
| inlet moist content | 23.53 %w.b. |
| grain flow | 20.8 bu/hr ft$^2$ |
| grain temp | 132.2 F |
| dryer length | 6.6 ft. |
| air temp outlet | 132.4 F |
| humidity air outlet | 0.0666 |
| grain temp | 132.3 F |
| outlet moist content | 21.40 %w.b. |

This gave a greatly improved moisture removal efficiency of 1370.47 B.T.U./lb of water removed.

C. The procedure of part B was now repeated but with the air outlet from the first stage drying connected to the air inlet of the second stage via a heater with total recycle of air. This procedure was carried out under the following conditions:

| | |
|---|---|
| air temp inlet | 400.0 F |
| humidity air inlet | .0356 (total recycle) |
| airflow | 125.0 cfm/ft$^2$ |
| inlet moist content | 25.53 %w.b. |
| grain flow | 20.8 bu/hr/ft$^2$ |
| grain temp | 132.2 F |
| dryer length | 6.6 ft |
| air temp outlet | 133.2 F |
| humidity air outlet | 0.1025 |
| grain temp | 133.0 |
| outlet moist content | 21.68 % w.b. |

Thus, it will be seen that this recycling of air provided an even greater moisture removal efficiency of 1106.30 B.T.U/lb of water removed.

EXAMPLE 2

Drying tests were conducted on Canadian white pea beans using a drying tower of the type shown in FIG. 1, with two drying stages. However, the cooling stage was not operated for these tests. The tower was 4 feet square, with each drying zone having a height of 6.5 feet and the steeping zone having a height of 12 feet.

The drying conditions and the characteristics of the beans to be dried were as follows:

Samples of the beans were taken from each stage and analysed and the results were as follows:

| TEST NUMBER | 1 | 2 | 3 | 4 | 5 | 6 | 7 |
|---|---|---|---|---|---|---|---|
| Stage 1-temp.°F | 71 | 72 | 90 | 87 | 96 | 90 | 91 |
| moisture, %w.b. | 20.0 | 20.9 | 18.6 | 19.3 | 19.0 | 20.9 | 20.5 |
| cracks, % | 1.4 | 1.7 | 5.1 | 3.6 | 3.4 | 1.3 | 2.3 |
| splits, % | 0.5 | 0.3 | 0.4 | 0.4 | 0.2 | 0.1 | 0.1 |
| Stage 2-temp. °F | 74 | 84 | 99 | 94 | 103 | 107 | 103 |
| Moisture, %w.b. | 19.3 | 17.7 | 16.7 | 17.0 | 16.9 | 18.8 | 18.6 |
| cracks, % | 2.2 | 5.2 | 8.8 | 10.1 | 9.6 | 8.7 | 7.2 |
| splits, % | 0.4 | 0.3 | 0.4 | 0.7 | 0.4 | 0.1 | 0.4 |
| Efficiency, BTU/lb water removed | 2145 | 1899 | 2269 | 1602 | 1580 | 1935 | 1802 |

No correlation can be observed in the change in splits with changes in exit temperature or moisture, while the cracks do show a correlation with exit temperature.

We claim as our invention:

1. A grain dryer comprising a tower with side walls, a top and a bottom, said tower having a wet grain receiving bin at the top, said bin having a first drying floor assembly extending across between the side walls of the tower, said floor assembly having a plurality of substantially uniformly spaced openings with a wet grain delivery tube member fixed beneath each said opening, each said tube member serving to deliver wet grain in response to gravity from said receiving bin into a first drying chamber located in the tower beneath said first floor assembly, a first heated air inlet adjacent said tube members adapted to deliver heated air into the spaces between said tube members and downwardly through a bed of grain in said first drying chamber, first exhaust ducts extending across said tower at the bottom of said first drying zone to receive and exhaust air flowing from said first heated air inlet through said bed of grain in a concurrent direction to grain flow, a steeping chamber located in the tower beneath said first exhaust ducts to allow the moisture profile in the individual kernels of grain to equalize, said steeping chamber having a floor consisting of a second drying floor assembly, a second heated air inlet adjacent the tube members of said second floor assembly and adapted to deliver heated air into the spaces between said tube members and downwardly through a bed of grain in a second drying chamber beneath said second floor, cooling air inlet ducts extending across the bottom of said second drying chamber for directing cooling air upwardly through the bed of grain, exhaust ducts extending across said second chamber intermediate said hot and cooling air inlet ducts to receive and exhaust air flowing from said second heated air inlet in a concurrent direction to grain flow and to receive and exhaust cooling air flowing from said cooling air inlet ducts in a countercurrent direction to grain flow, means for providing hot air to said hot air inlets and cooling air to said cooling air inlets and means for collecting dried grain from said second drying chamber and discharging the grain at a controlled rate.

2. A grain dryer according to claim 1 wherein said steeping chamber has a height of at least 6 feet.

3. A grain dryer according to claim 1 wherein said steeping chamber has a height of at least 12 feet.

4. A grain dryer according to claim 1 wherein the drying zones have heights in the range of 3 to 6 feet.

5. A grain dryer according to claim 1 wherein the first drying zone has a height of 3 to 4 feet, the second drying zone has a height of 4 to 5 feet and the steeping chamber has a height sufficient to provide a grain residence time therein of at least 1 hour.

6. A grain dryer according to claim 1 wherein said first exhaust ducts are connected via an air conduit to said second heated air inlet, said conduit including a blower and heater.

7. A grain dryer according to claim 1 which includes at least three drying floor assemblies, at least three exhaust duct assemblies and at least two steeping chambers.

8. A grain dryer comprising a tower with side walls, a top and a bottom, said tower having a wet grain receiving bin at the top, said bin having a first drying floor assembly extending across between the side walls of the tower, said floor assembly having a plurality of substantially uniformly spaced openings with a wet grain delivery tube member fixed beneath each said opening, each said tube member serving to deliver wet grain in response to gravity from said receiving bin into a first drying chamber located in the tower beneath said first floor assembly, a first heated air inlet adjacent said tube members adapted to deliver heated air into the spaces between said tube members and downwardly through a bed of grain in said first drying chamber, first exhaust ducts extending across said tower at the bottom of said first drying zone to receive and exhaust air flowing from said first heated air inlet through said bed of grain in a concurrent direction to grain flow, a first steeping chamber located in the tower beneath said first exhaust ducts to allow the moisture profile in the individual kernels of grain to equalize, said steeping chamber having a floor consisting of a second drying floor assembly, a second heated air inlet adjacent the tube members of said second floor assembly and adapted to deliver heated air into the spaces between said tube members and downwardly through a bed of grain in a second drying chamber beneath said second floor, second exhaust ducts extending across said tower at the bottom of said second drying zone to receive and exhaust air flowing from said second heated air inlet through said bed of grain in a concurrent direction to grain flow, a second steeping chamber located in the tower beneath said second exhaust ducts to allow the moisture profile in the individual kernels of grain to again equalize, said second steeping chamber having a floor consisting of a third said drying floor assembly, a third heated air inlet adjacent the tube members of said first floor assembly and adapted to deliver heated air into the spaces between said tube members and downwardly through a bed of grain in a third drying chamber beneath said third floor, cooling air inlet ducts extending across the bottom of said third drying chamber for directing cooling air upwardly through the bed of grain, exhaust ducts extending across said third chamber intermediate said hot and cooling air inlet ducts to receive and exhaust air flowing from said third heated air inlet in a concurrent direction to grain flow and to receive and exhaust cooling air flowing from said cooling air inlet ducts in a countercurrent direction to grain flow, means for providing hot air to said hot air inlets and cooling air to said cooling air inlets and means for collecting dried grain from said third drying chamber and discharging the grain at a controlled rate.

9. A grain dryer according to claim 8 wherein each steeping chamber has a height of at least 6 feet.

10. A grain dryer according to claim 8 wherein each steeping chamber has a height of at least 12 feet.

11. A grain dryer according to claim 8 wherein the drying zones have heights in the range of 3 to 6 feet.

12. A grain dryer according to claim 8 wherein the first drying zone has a height of 3 to 4 feet, the second drying zone has a height of 4 to 5 feet, the third drying zone has a height of 5 to 6 feet and the steeping chamber has a height sufficient to provide a grain residence time therein of at least 1 hour.

13. A grain dryer according to claim 8 wherein said first exhaust ducts are connected via an air conduit to said second heated air inlet and said second exhaust ducts are connected via an air conduit to said third heated air inlet, each said conduit including a blower and heater.

* * * * *